(12) United States Patent
de Andrade et al.

(10) Patent No.: US 11,991,160 B2
(45) Date of Patent: May 21, 2024

(54) SYSTEMS AND METHODS FOR PROVIDING SECURE SERVICES

(71) Applicant: Comcast Cable Communications, LLC, Philadelphia, PA (US)

(72) Inventors: David de Andrade, Fairfax, CA (US); Patrick Ladd, San Marcos, CA (US); John Brzozowski, Schwenksville, PA (US); John Leddy, Bryn Mawr, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 15/908,511

(22) Filed: Feb. 28, 2018

(65) Prior Publication Data

US 2019/0044933 A1 Feb. 7, 2019

Related U.S. Application Data

(63) Continuation of application No. 14/079,174, filed on Nov. 13, 2013, now Pat. No. 9,942,213.

(60) Provisional application No. 61/786,699, filed on Mar. 15, 2013.

(51) Int. Cl.
H04W 12/069 (2021.01)
H04L 9/32 (2006.01)
H04L 9/40 (2022.01)
H04W 12/06 (2021.01)

(52) U.S. Cl.
CPC ............ *H04L 63/08* (2013.01); *H04L 9/3234* (2013.01); *H04L 63/068* (2013.01); *H04L 63/0823* (2013.01); *H04W 12/068* (2021.01); *H04W 12/069* (2021.01)

(58) Field of Classification Search
CPC ..... H04L 63/08; H04L 9/3234; H04L 63/068; H04L 63/0823
USPC ........................................................ 713/168
See application file for complete search history.

(56) References Cited

U.S. PATENT DOCUMENTS

| | | | | |
|---|---|---|---|---|
| 5,117,458 | A | * | 5/1992 | Takaragi ................ H04L 9/0833 713/172 |
| 5,619,274 | A | * | 4/1997 | Roop .................... H04N 21/435 348/E5.103 |
| 6,091,884 | A | * | 7/2000 | Yuen ........................ G11B 33/10 386/245 |
| 6,792,474 | B1 | * | 9/2004 | Hopprich ............ H04L 63/0442 709/227 |
| 6,859,535 | B1 | | 2/2005 | Tatebayashi et al. |
| 6,938,162 | B1 | * | 8/2005 | Nagai .............. G11B 20/00268 |
| 6,987,842 | B1 | * | 1/2006 | Mankovitz ......... H04N 21/6187 348/E7.063 |

(Continued)

OTHER PUBLICATIONS

Menezes, et al., "Handbook of Applied Cryptography," Jan. 1, 1997, CRC Press (pp. 359-368, 386-387, 397, and 400-405).

(Continued)

*Primary Examiner* — Thanh T Le
(74) *Attorney, Agent, or Firm* — Ballard Spahr LLP

(57) ABSTRACT

Systems and methods for providing one or more secure services are disclosed. One method can comprise authenticating and/or authorizing a user device to receive a security token. A request for information can be processed using the security token to facilitate the secure provision of services to the user device.

23 Claims, 13 Drawing Sheets

(56) References Cited

U.S. PATENT DOCUMENTS

| | | | | |
|---|---|---|---|---|
| 7,583,801 | B2* | 9/2009 | Terekhova | H04N 21/2541 713/168 |
| 7,620,185 | B2* | 11/2009 | Lahtinen | H04H 60/23 380/276 |
| 7,971,240 | B2 | 6/2011 | Guo et al. | |
| 8,010,783 | B1* | 8/2011 | Cahill | H04L 63/10 713/155 |
| 8,417,944 | B2* | 4/2013 | Praden | H04N 21/2396 713/163 |
| 8,418,203 | B1* | 4/2013 | Nishio | H04N 21/4351 725/32 |
| 8,613,026 | B2* | 12/2013 | Malhotra | H04N 7/163 709/227 |
| 9,270,660 | B2* | 2/2016 | Smith | H04W 12/08 |
| 9,942,213 | B2 | 4/2018 | de Andrade et al. | |
| 2002/0184521 | A1* | 12/2002 | Lucovsky | G06F 21/6218 726/6 |
| 2003/0105637 | A1* | 6/2003 | Rodriguez | G06F 40/242 704/E15.047 |
| 2003/0145205 | A1* | 7/2003 | Sarcanin | G06Q 20/02 713/172 |
| 2003/0149880 | A1* | 8/2003 | Shamsaasef | H04L 63/062 713/182 |
| 2004/0179682 | A1* | 9/2004 | Soliman | H04L 9/0822 380/44 |
| 2005/0010774 | A1* | 1/2005 | Rose | H04W 12/0431 713/171 |
| 2005/0094812 | A1* | 5/2005 | Terekhova | H04N 21/835 375/E7.009 |
| 2005/0143085 | A1* | 6/2005 | Bi | H04W 72/30 455/452.2 |
| 2005/0278787 | A1 | 12/2005 | Naslund et al. | |
| 2006/0025132 | A1* | 2/2006 | Karaoguz | H04M 1/72502 455/433 |
| 2006/0059090 | A1* | 3/2006 | Lahtinen | H04N 21/63345 348/E7.063 |
| 2006/0085862 | A1* | 4/2006 | Witt | H04N 21/26613 726/28 |
| 2007/0143488 | A1* | 6/2007 | Pantalone | H04L 63/08 709/227 |
| 2007/0209065 | A1 | 9/2007 | Branam et al. | |
| 2007/0214356 | A1 | 9/2007 | Song et al. | |
| 2008/0031448 | A1* | 2/2008 | Dang | H04N 21/23476 348/E7.056 |
| 2008/0168568 | A1 | 7/2008 | Brodersen et al. | |
| 2008/0175390 | A1* | 7/2008 | Alessio | G06Q 20/341 380/278 |
| 2008/0271103 | A1* | 10/2008 | Praden | H04N 21/4516 725/116 |
| 2008/0295140 | A1* | 11/2008 | Praden | H04N 7/17318 348/E7.071 |
| 2009/0122981 | A1* | 5/2009 | Kaji | H04L 9/302 380/47 |
| 2009/0164776 | A1* | 6/2009 | Tuoriniemi | H04L 63/10 713/158 |
| 2010/0064306 | A1* | 3/2010 | Tiongson | H04N 21/4758 725/62 |
| 2010/0293604 | A1 | 11/2010 | Nanda et al. | |
| 2010/0318791 | A1* | 12/2010 | Shamsaasef | H04L 63/0823 713/158 |
| 2011/0069838 | A1* | 3/2011 | Jung | H04L 63/06 380/270 |
| 2011/0106710 | A1* | 5/2011 | Reed | H04L 9/3226 705/44 |
| 2011/0141377 | A1* | 6/2011 | Maruyama | H04N 21/426 348/732 |
| 2011/0149874 | A1* | 6/2011 | Reif | H04L 63/08 370/329 |
| 2011/0311045 | A1* | 12/2011 | Candelore | H04N 21/23895 380/210 |
| 2012/0270558 | A1* | 10/2012 | Busch | H04W 4/06 455/456.1 |
| 2013/0083924 | A1* | 4/2013 | Wei | H04L 9/3066 380/255 |
| 2013/0097671 | A1* | 4/2013 | Fouchard | H04L 12/2838 726/3 |
| 2013/0179952 | A1 | 7/2013 | O'Donnell et al. | |
| 2013/0283033 | A1* | 10/2013 | Ahuja | H04L 9/3213 713/150 |
| 2014/0047237 | A1* | 2/2014 | Parrish | H04L 9/065 713/168 |
| 2014/0157298 | A1* | 6/2014 | Murphy | H04N 21/64322 725/14 |
| 2014/0164772 | A1* | 6/2014 | Forte | G06F 21/6209 713/171 |
| 2014/0281533 | A1 | 9/2014 | de Andrade et al. | |
| 2014/0281539 | A1 | 9/2014 | Faltyn et al. | |
| 2014/0281553 | A1* | 9/2014 | Illion | H04L 51/28 713/173 |
| 2018/0184479 | A1* | 6/2018 | Motto | H04W 12/06 |

OTHER PUBLICATIONS

Menezes, et al.: "Handbook of Applied Cryptography", CRC Press LLC pp. 349-554 (1996).

Menezes, et al. "Chapter 10: Identification and Entity Authentication ED-" Handbook of Applied Cryptography; pp. 385-424 (1996).

Extended European Search Report dated Feb. 19, 2015 by the European Patent Office for application EP 14159717.9, filed Mar. 14, 2014, and published as EP 2779575 on Sep. 17, 2014 (Inventor—de Andrade, et al // Applicant—Comcast Corp.) (6 pages).

* cited by examiner

SYSTEMS AND METHODS FOR PROVIDING SECURE SERVICES

CROSS REFERENCE TO RELATED PATENT APPLICATIONS

This application is a continuation of U.S. patent application Ser. No. 14/079,147 filed Nov. 13, 2013, which claims priority to U.S. Provisional Patent Application No. 61/786,699 filed Mar. 15, 2013, herein incorporated by reference in their entirety.

BACKGROUND

Multiple devices may be connected to the same local area network (LAN) to access services. Often one or more of the devices must be authenticated to access the services. Authentication is typically device specific and not application specific. Further, the discovery of accessible services is often not a secure procedure. These and other shortcomings will be addressed by the present disclosure.

SUMMARY

It is to be understood that both the following general description and the following detailed description are exemplary and explanatory only and are not restrictive. Provided are methods and systems for providing secure services. In an aspect, services can be provided to one or more device coupled to a LAN.

In an aspect, methods can comprise establishing a communication session with a device, such as a client device, computing device, user application, user agent, or the like. The device can be located within a first network that is external to a second network. The device can be authenticated by a security element located within the second network. The device can be authorized to receive a security token. The security token can be provided to the authorized device. The security token can be provided to a gateway, wherein the security token can facilitate the secure transmission of data from the gateway to the device.

In an aspect, methods can comprise receiving an authorization element. The authorization element can be received by a first device, such as an authenticated user agent. The first device can be authorized, for example, by using the authorization element. A security token can be received based upon authorization of the first device. A request for data can be transmitted to a second device, such as a gateway. The request can comprise an unencrypted data field and an encrypted data field, wherein the encrypted data field is encrypted using the security token. The encrypted data field can be encrypted using the security token such that the second device will authenticate the request for information using the security token. The second device can process the request, for example, using the security token, and the requested data can be transmitted by the second device.

In an aspect, methods can comprise receiving a request for data. The request can comprise an unencrypted data field and an encrypted data field. The encrypted data field can be decrypted using a security token. The decrypted data field can be compared to the unencrypted data field and if the decrypted data field substantially matches the unencrypted data field, the requested data can be transmitted to a source of the request for data.

In an aspect, methods can comprise receiving, by a computing device, availability information in a first format. The availability information can relate to one or more services available via a network. The availability information in the first format can be processed to generate availability information in a second format. The computing device can access and/or receive the one or more services using the availability information in the second format.

In an aspect, methods can comprise transmitting first availability information in an unencrypted format. The first availability information can relate to a first service available via a network. Second availability information can be transmitted in an encrypted format. The second availability information can relate to a second service available via the network. A request for services can be received using one or more of the first availability information and the second availability information. The request for services can be received from a first device using one or more of the first availability information and the second availability information, wherein the first device is configured to decrypt the second availability information.

Additional advantages will be set forth in part in the description, which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1A:
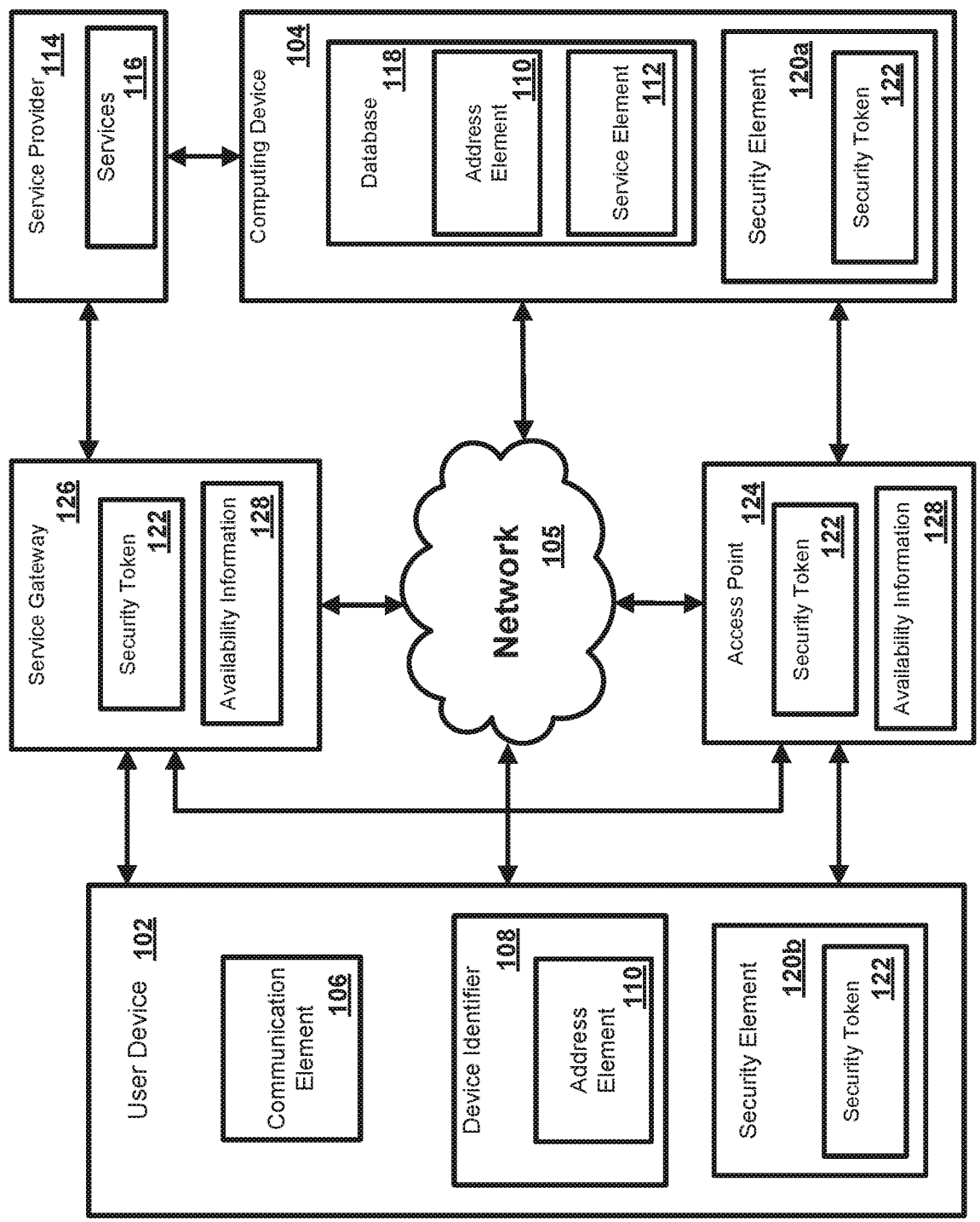
FIG. 1A is a block diagram of an example system and network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In one aspect of the disclosure, a system can be configured to provide services such as media-related services to one or more devices, such as user devices. Services can comprise printer services, media services (e.g., tuner, DVR, file store), content services (e.g., premium linear, On Demand, DVR content services), interactive services (e.g., RUI, advertising, second-screen), security services (e.g., switches, thermostats, cameras, contact closures, detectors), gaming services (e.g., multi-player/multi-device), computer services, storage services, and the like. Services can be advertised (e.g., securely broadcast) within the home. Services can also be aggregated and advertised (e.g., while encrypted) by the service provider. As an example, services such as a local media server, a content tuner, IP video, and the like can be available on a local network (e.g., home network). As another example, one or more devices can selectively and securely discover the services available on the local network and can be configured to access the services. As a further example, one or more devices can use a security token to authenticate requests for services received from one or more devices.

Figure 1B:
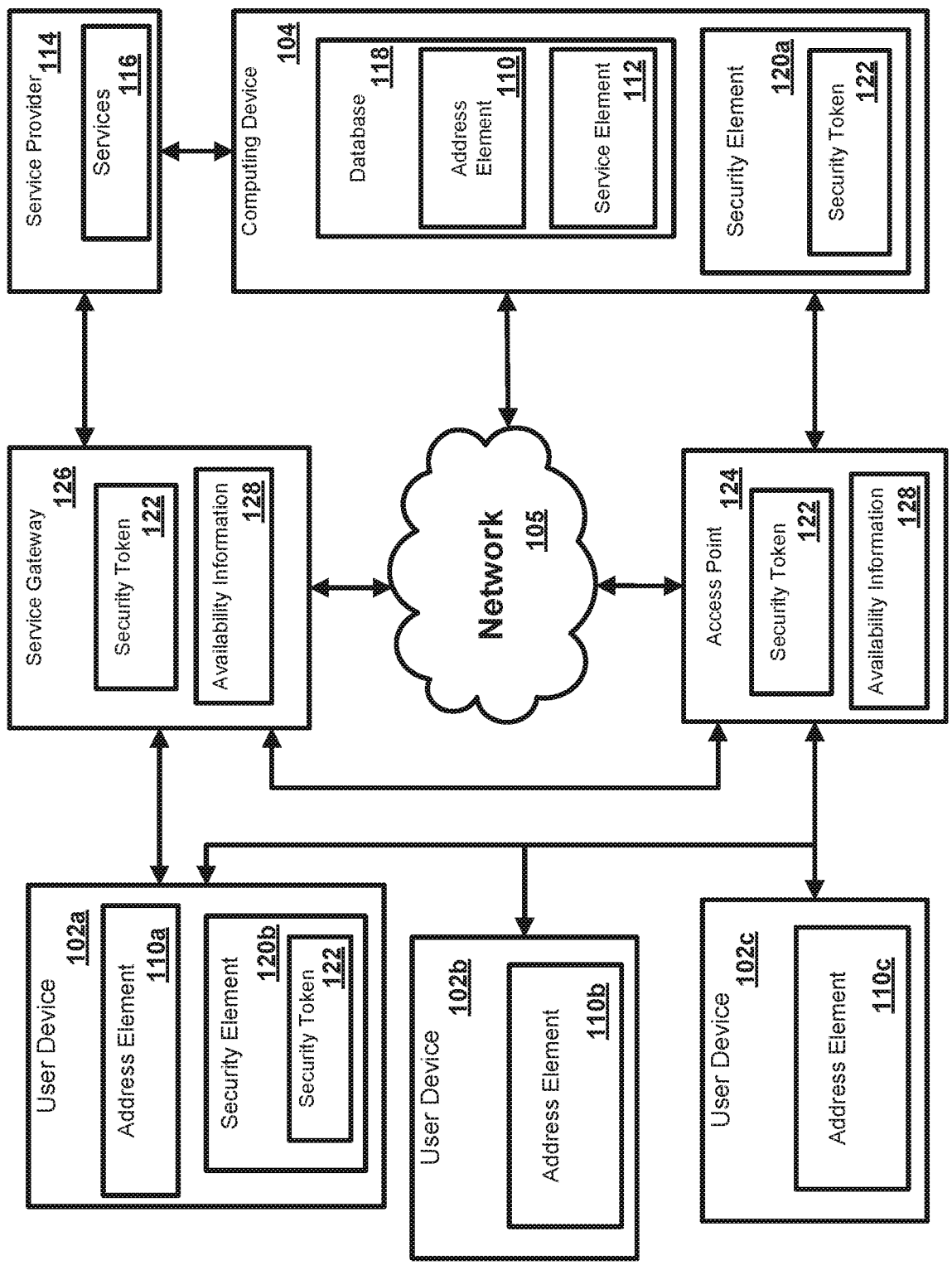
FIG. 1B is a block diagram of an example system and network.

FIGS. 1A-1B illustrate various aspects of an exemplary network in which the present methods and systems can operate. The present disclosure is relevant to systems and methods for providing services to a user device, for example. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The network can comprise a user device 102 in communication with a computing device 104 such as a server, for example. The computing device 104 can be disposed locally or remotely relative to the user device 102. As an example, the user device 102 and the computing device 104 can be in communication via a private and/or public network 105, such as the Internet. Other forms of communications can be used, such as wired and wireless telecommunication channels, for example.

In an aspect, the user device 102 can be an electronic device such as a computer, a smartphone, a laptop, a tablet, a set top box, a display device, or other device capable of communicating with the computing device 104. As an example, the user device 102 can comprise a communication element 106 for providing an interface to a user to interact with the user device 102 and/or the computing device 104. The communication element 106 can be any interface for presenting information to the user and receiving a user feedback, such as a web browser (e.g., Internet Explorer, Mozilla Firefox, Google Chrome, Safari, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device, such as the computing device 104.

In an aspect, the user device 102 can be associated with a user identifier or device identifier 108. As an example, the device identifier 108 can be any identifier, token, character, string, or the like, for differentiating one user or user device (e.g., user device 102) from another user or user device. In a further aspect, the device identifier 108 can identify a user or user device as belonging to a particular class of users or user devices. As a further example, the device identifier 108 can comprise information relating to the user device, such as a manufacturer, a model or type of device, a service provider associated with the user device 102, a state of the user device 102, a locator, and/or a label or classifier. Other information can be represented by the device identifier 108.

In an aspect, the device identifier 108 can comprise an address element 110. In an aspect, the address element 110 can be an internee protocol address, a network address, a location identifier, or the like. As an example, the address element 110 can be relied on to establish a communication session between the user device 102 and the computing device 104 or other devices and/or networks. As a further example, the address element 110 can be used as an identifier or locator of the user device 102. In an aspect, the address element 110 can be persistent for a particular network.

In an aspect, a service element 112 can comprise and/or determine an identification of a service provider 114 (or a particular service) associated with one or more of the user device 102 and the computing device 104. As an example, the service element 112 can comprise information relating to or provided by a communication service provider (e.g., Internet service provider) that is providing or enabling one or more services 116 to the computing device 104. As another example, the service element 112 can comprise information relating to a preferred service provider (e.g., service provider 114) and/or for one or more particular services 116 relating to the user device 102. As another example, the service element 112 can comprise software, virtual elements, computing devices, network devices, communication hardware, a combination thereof, and/or the like. As a further example, the computing device 104 can provide services such as printing, media management (e.g., media server), content services, file download service, streaming services, digital living network alliance (DLNA) enabled services, or other services.

In an aspect, one or more of the address element 110 and the service element 112 can be stored remotely from the user device 102 and retrieved by one or more devices such as the user device 102 and the computing device 104. Other information can be represented by the service element 112.

In an aspect, the computing device 104 can be a server, gateway, network device, router, access point, user premises equipment and the like for communicating with the user device 102. As an example, the computing device 104 can communicate with the user device 102 for providing services to the user device 102. In an aspect, the computing device 104 can allow the user device 102 to interact with remote resources such as data, devices, and files. As an example, the computing device 104 can be configured as a network gateway device, which can receive content (e.g., data, programming, content, etc.) from multiple sources, such as a central location, a headend, processing facility, service provider 114, or a combination thereof. The computing device 104 can combine the content from the various sources and can distribute the content to user (e.g., subscriber) locations via a distribution system, network, private network, or communication channel, or a combination thereof.

In an aspect, the computing device 104 can manage the communication between the user device 102 and a database 118 for sending and receiving data therebetween. As an example, the database 118 can store a plurality of files (e.g., web pages), user identifiers or records, or other information. As a further example, the user device 102 can request and/or retrieve a file from the database 118. In an aspect, the database 118 can store information relating to the user device 102, the address element 110, and/or the service element 112. As an example, the computing device 104 can obtain the device identifier 108 from the user device 102 and retrieve information from the database 118 such as the address element 110 and/or the service elements 112. As a further example, the computing device 104 can obtain the address element 110 from the user device 102 and can retrieve the service element 112 from the database 118, or vice versa. Any information can be stored in and retrieved from the database 118. The database 118 can be disposed remotely from the computing device 104 and accessed via direct or indirect connection. The database 118 can be integrated with the computing system 104 or some other device or system.

In an aspect, one or more security elements 120*a*, 120*b* can be configured to authenticate and/or authorize one or more devices such as user device 102. As an example, the security element 120*a*, 120*b* can be in communication with and/or integrated with one or more of the user device 102 and the computing device 104. As a further example, a plurality of the security elements 120*a*, 120*b* can be configured to communicate with each other in order to authenticate and/or authorize one or more devices such as the user device 102. In another aspect, one or more security elements 120*a*, 120*b* can be configured to provide a security token 122 to one or more devices such as user device 102, computing device 104, access point 124, service gateway 126, and the like. As an example, the security token 122 can comprise a security key (e.g., AES128), a mechanism to provide a decrypt key (e.g., Playready, FlashAccess), a function, a character or bit string, and the like. As a further example, the security token 122 can be used to encrypt and/or decrypt information transmitted between devices, such as a request for data transmitted from the user device 102 to another user device 102, the computing device 104, an access point 124, and/or a service gateway 126.

In an aspect, one or more access points 124 can be in communication with a network, such as network 105. As an example, one or more of the access points 124 can facilitate the connection of a device, such as user device 102, to the network 105. As a further example, one or more of the access points 124 can be configured as a wireless access point (WAP). In an aspect, one or more access points 124 can be configured to allow one or more wireless devices to connect to a wired and/or wireless network using Wi-Fi, Bluetooth, or similar standard. The access point 124 can provide communication via wireless and/or wired protocols and physical layer mechanisms.

In an aspect, one or more service gateways 126 can be configured to provide services, such as services 116 provided by service provider 114 and/or services provided via network 105. As an example, the service gateway 126 can be configured as a proxy for the service provider 114. As a further example, the service gateway 116 can be configured as part of a LAN in order to provide services to devices coupled to the LAN. In another aspect, the service gateway 126 can provide availability information 128 relating to one or more services available via the service gateway 126 or device in communication with the service gateway 126. As an example, availability information 128 can comprise identifiers and/or information for access to available services.

As more clearly shown in FIG. 1B, one or more user devices 102a, 120b, 102c can be configured as a network, such as a LAN. In an aspect, one or more of the user devices 102a, 102b, 102c can be associated with a respective address element 110a, 110b, 110c. In another aspect, the address element 110a, 110b, 110c can he an internet protocol address, a network address, an Internet address, a device identifier (e.g., MAC address), or the like. As an example, the address element 110a, 110b, 110c can be relied upon to establish a communication session between one or more user devices 102a, 102b, 102c and the computing device 104 or other devices and/or networks. As a further example, one or more of the address elements 110a, 110b, 110c can be used as an identifier or locator of the user device 102a, 102b, 102c. In a further aspect, one or more of the address elements 110a, 110b, 110c can be persistent for a particular network.

In an aspect, availability information 128 can be provided to one or more of the user devices 102a, 102b, 102c. As an example, availability information can relate to one or more services available to one or more of the devices 102a, 102b, 102c. As a further example, at least a portion of the availability information 128 can be encoded and/or encrypted such that only an authorized receiving device can decode and/or decrypt the at least the portion of the availability information 128. In an aspect, at least a portion of the availability information can be unencrypted and unencrypted availability information 128 can be provided to one or more of the devices 102a, 102b, 102c, and the one or more of the devices 102a, 102b, 102c can use the unencrypted availability information 128 to facilitate receiving services. In another aspect, certain select services can be identified by encrypted availability information 128. The encrypted availability information 128 can be provided to one or more of the devices 102a, 102b, 102c. As such, the one or more of the devices 102a, 102b, 102c having the security token 122 to decrypt the encrypted availability information 128 can use the decrypted availability information 128 to facilitate receiving the select services. Any of the user devices 102a, 102b, 102c not having the security token may not be able to interpret the encrypted availability information 128 and, thus, may not be provisioned configured to receive the select services.

As an example, a user premises network (e.g., LAN, customer network, etc.) can comprise a wireless printer. The printer can announce the availability of printing services openly over the user premises network. As another example, a name or identifier, such as "John Doe's Printer," can be openly advertised to be available at an associated address (e.g., IP address 10.0.0.10 and 2001:db8:0:10:0:0:10). Computing devices such as a user device can receive the announced information and can use such information to access printing services to the user device from "John Doe's Printer." As a further example, a file-sharing device can be connected to the user premises network, for example, via a router. The user premises router can selectively advertise the availability of file sharing services. It may be desirable to securely advertise the file sharing service. As such, the identifier and address of the file-sharing service can be announced in an encrypted state. For example, instead of seeing "John Doe's File Sharing" at 10.0.0.11 or 2001:db8:0:10:0:0:11, the identifier and address can be received as encrypted data such as, 6c1e9318e64974c036bb1619b03ec5d8 at db1dd528b0e0c9a347eda778aec00559 or 4e4004437139efa09b21fd7a9f04648a. Without decryption, such encrypted service information may be unusable and as such the service, while openly advertised, is protected due to the encrypted nature of the secured service discovery data. When a specific device or specific application on a device, such as a user device, has the necessary information to decode and/or decrypt the secure service discovery data, the same could in turn proceed with enabling support for the service. End user authorization may or may not be utilized.

Figure 2:
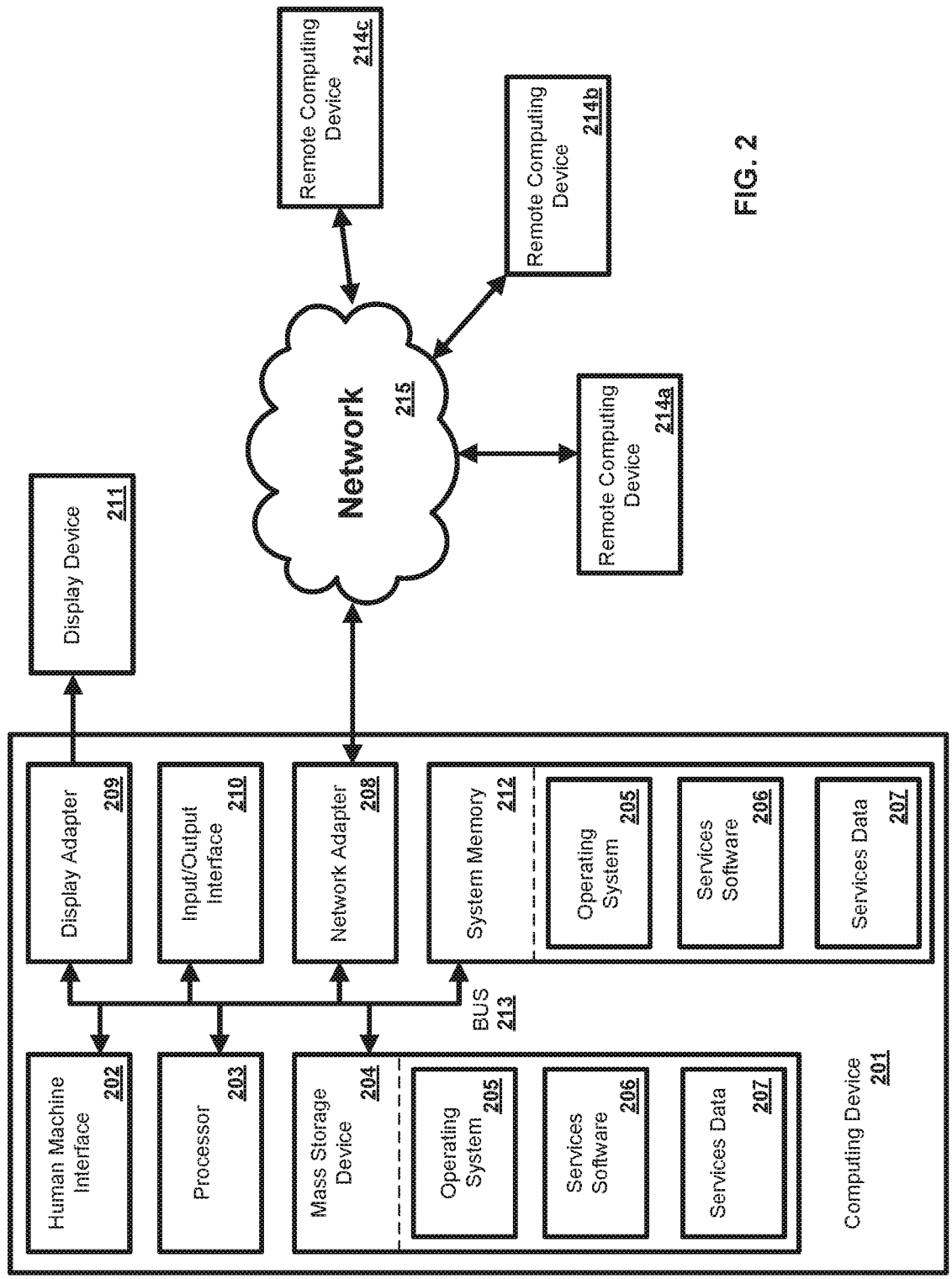
FIG. 2 is a block diagram of an example computing device.

In an exemplary aspect, the methods and systems can be implemented on a computing system such as computing device 201 as illustrated in FIG. 2 and described below. By way of example, one or more of the user device 102 and the computing device 104 of FIG. 1 can be a computer as illustrated in FIG. 2. Similarly, the methods and systems disclosed can utilize one or more computers to perform one or more functions in one or more locations. FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices.

Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 201. The components of the computing device 201 can comprise, but are not limited to, one or more processors or processing units such as processor 203, a system memory 212, and a system bus 213 that couples various system components including the processor 203 to the system memory 212. In the case of multiple processing units 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, services software 206, services data 207, a network adapter 208, system memory 212, an Input/Output Interface 210, a display adapter 209, a display device 211, and a human machine interface 202, can be contained within one or more remote computing devices 214a,b,c at physically separate locations, connected through buses of this form, in effect implementing a fully distributed system.

The computing device 201 typically comprises a variety of computer readable media. Exemplary readable media can be any available media that is accessible by the computing device 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as services data 207 and/or program modules such as operating system 205 and services software 206 that are immediately accessible to and/or are presently operated on by the processor 203.

In another aspect, the computing device 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computing device 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and services software 206. Each of the operating system 205 and services software 206 (or some combination thereof) can comprise elements of the programming and the services software 206. Services data 207 can also be stored on the mass storage device 204. Services data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 201 via an input device (not shown). Examples of such input devices comprise, but are not limited to, a keyboard, pointing device (e.g., a "mouse"), a microphone, a joystick, a scanner, tactile input devices such as gloves, and other body coverings, and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computing device 201 can have more than one display adapter 209 and the computer 201 can have more than one display device 211. For example, a display device can be a monitor, an LCD (Liquid Crystal Display), or a projector. In addition to the display device 211, other output peripheral devices can comprise components such as speakers (not shown) and a printer (not shown) which can be connected to the computing device 201 via Input/Output Interface 210. Any step and/or result of the methods can be output in any form to an output device. Such output can be any form of visual representation, including, but not limited to, textual, graphical, animation, audio, tactile, and the like. The display 211 and computing device 201 can be part of one device, or separate devices.

The computing device 201 can operate in a networked environment using logical connections to one or more remote computing devices 214a,b,c. By way of example, a remote computing device can be a personal computer, portable computer, a smart phone, a server, a router, a network computer, a peer device or other common network node, and so on. Logical connections between the computing device 201 and a remote computing device 214a,b,c can be made via a network 215, such as a local area network (LAN) and a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of services software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

Figure 3:
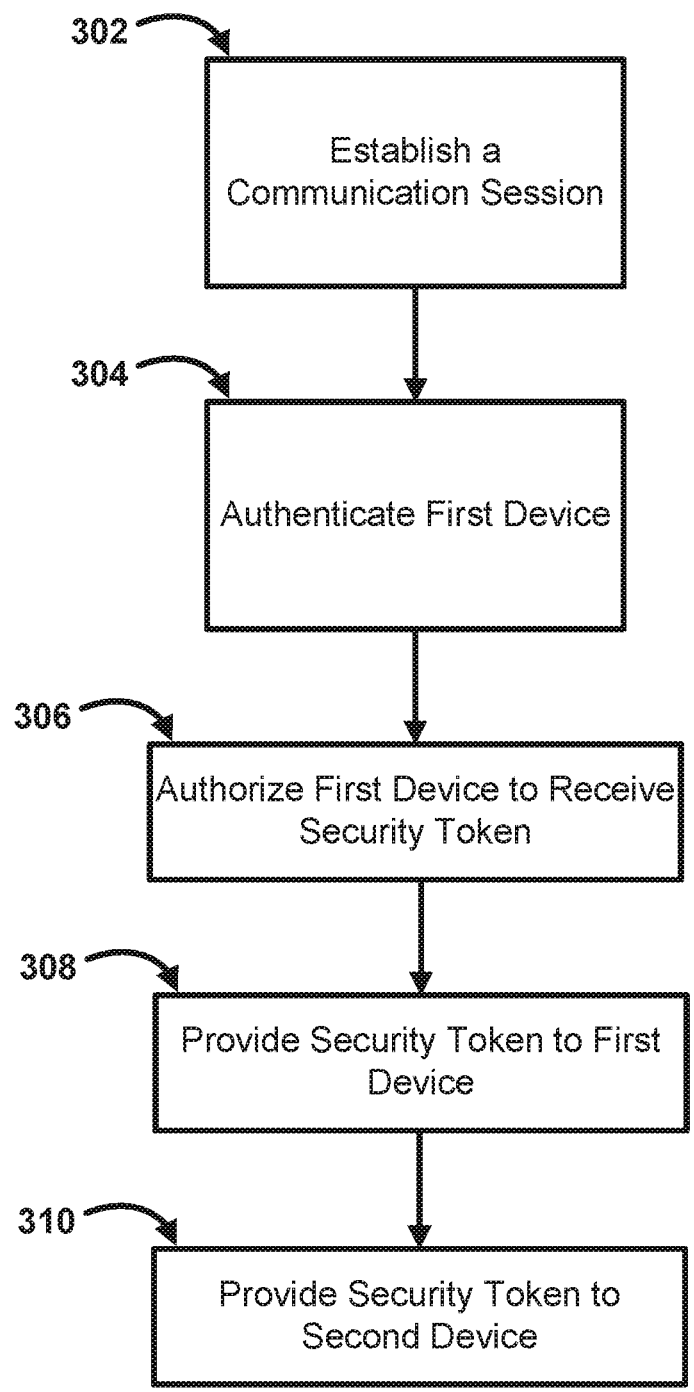
FIG. 3 is a flow chart of an example method.

An exemplary method for providing secure services to a device is shown in FIG. 3. In step 302, a communication session can be established. In an aspect, the communication session can be established between two or more computing devices (e.g., client device, user agent, application, user device, service provider, service agent, security device, etc.) In another aspect, a first computing device can be located within a first network that is external to a second network. One or more of the first network and the second network can be a LAN, a wide-area network (WAN), wireless network, and the like. As an example, a first computing device can be part of a LAN, while a second computing device located outside the LAN is in communication with the first computing device.

In step 304, a device can be authenticated. In an aspect, a first device (e.g., the first computing device) can be authenticated via a security element. As an example, the security element can be in communication with and/or integrated with the second computing device. As another example, the security element can be located within the second network. The security element can be associated with an addressable identifier to facilitate communication with the security element. The first computing device (e.g., via a communication element such as a browser) may communicate with the security element using the addressable identifier to request authentication. In an aspect, authenticating the first computing device can comprise receiving user information such as user credentials.

One or more security elements can be configured to communicate with each other to facilitate authentication of a device such as the first computing device. For example, a first security element can be in communication with and/or integrated with the first computing device, while a second security element is disposed external to the first computing device. As a further example, the first security element can communicate with the second security element to authenticate the first computing device.

In step 306, a user and/or device, such as the first computing device, can be authorized to receive a security token. In an aspect, the first computing device can be authorized via a security element. As an example, the security element can be in communication with and/or integrated with the second computing device. As another example, the security element can be located within the second network. As a further example, authorizing the user or device (e.g., first computing device) can comprise comparing information received from the user or device to stored information such as a user account.

In another aspect, one or more security elements can be configured to communicate with each other to facilitate authorization of a device such as the first computing device. For example, a first security element can be in communication with and/or integrated with the first computing device, while a second security element is disposed external to the first computing device. As a further example, the first security element can communicate with the second security element to authorize the first computing device.

In step 308, the security token can be provided to a device such as the first computing device. In an aspect, the security token can comprise a security key, a function, a character or bit string, and the like. As an example, the security token can be used to encrypt and/or decrypt information transmitted between devices, such as a request for data transmitted between the first computing device and another device (e.g., user device, second computing device, an access point, a service gateway, and the like). As another example, the security token can be associated with an addressable identifier to facilitate transmission, tracking, and processing of the security token. As a further example, the security token can be a renewable security token having a predetermined time duration before expiration and a mechanism for renewing or resetting the time duration. In another aspect, providing the security token to the first computing device can comprise one or more of transmitting the security token to the first computing device, activating the security token, and renewing the security token.

In step 310, the security token can be provided to a second device (e.g., second computing device such as a service gateway. In an aspect, the security token can facilitate the secure transmission of data from the second computing device (e.g., gateway) to the first computing device. As an example, providing the security token to a second computing device can comprise one or more of transmitting the security token, activating the security token, and renewing the security token. As another example, the security token can be used to encrypt at least a portion of a request for services, wherein the second computing device can receive the encrypted request, decrypt the request using the security token and authenticate the request. As such, an authenticated request can be satisfied by transmitting the requested service(s).

In an aspect, the first device can transmit a request for service comprising unencrypted information and encrypted information. As an example, the encrypted information can be encrypted using the received security token. As a further example, the encrypted information can be the encrypted state of the unencrypted information. As such, the second device can receive the request and can read the unencrypted information without a key such as the security token. In order to authenticate the request from the first device, the second device can use the received security token to decrypt the encrypted information and can comprise the decrypted information with the unencrypted information. If the comparison results in a match, then the request and/or source of the request can be authenticated and the request can be fulfilled. Accordingly, the first device can make requests for secure services using the security token. The request can be processed by a facilitator of the secure services using the security token. As such, the request can be processed independent of the manufacturer's credentials associated with the first device.

Figure 4:
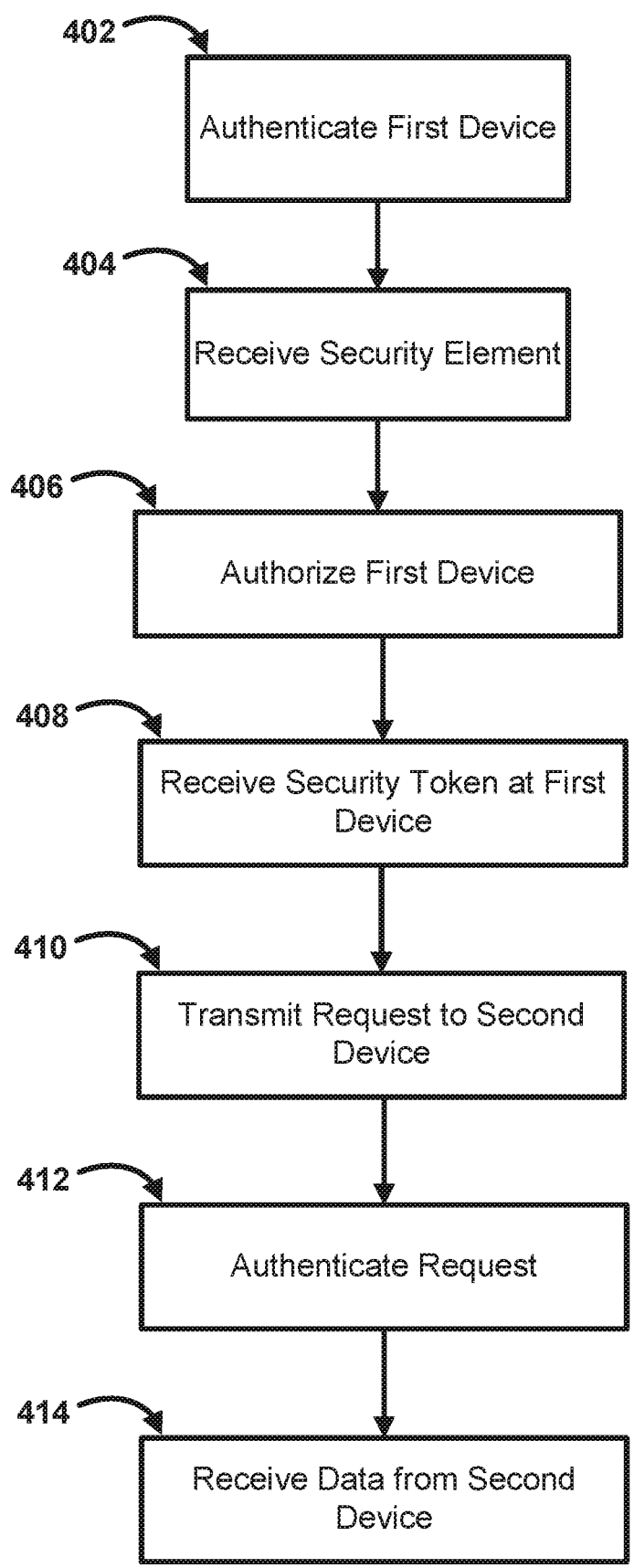
FIG. 4 is a flow chart of an example method.

An exemplary method for providing secure services to a device is shown in FIG. 4. In step 402, a first device, such as a user device, can be authenticated. In an aspect, the first device can be authenticated via a security element. As an example, the security element can be in communication with and/or integrated with the first device. The security element can be associated with an addressable identifier to facilitate communication with the security element. The first device (e.g., via a communication element such as a browser) can communicate with the security element using the addressable identifier to request authentication. In an aspect, authenticating the first device can comprise receiving user information such as user credentials. In another aspect, authenticating a user or first device can comprise using a public key infrastructure protocol.

In an aspect, one or more security elements can be configured to communicate with each other to facilitate authentication of the first device. For example, a first security element can be in communication with and/or integrated with the first device, while a second security element is disposed external to the first device. As a further example, the first security element can communicate with the second security element to authenticate the user device.

In step 404, a security element (e.g., authentication element, authorization element, user agent, software, etc.) can be received. In an aspect, the security element can be received by the first device based upon authentication of the first device. In another aspect, the security element can facilitate the secure communication between the first device and another device.

In step 406, the first device or user associated with the first device can be authorized to receive a security token. In an aspect, the first device can be authorized via the received security element. As an example, the security element can be in communication with and/or integrated with the first device. As a further example, authorizing the user or first device can comprise comparing information received from the user or first device to and stored information such as a user account. In another aspect, one or more security elements can be configured to communicate with each other to facilitate authorization of a device, such as the first device. For example, a first security element can be in communication with and/or integrated with the first device, while a second security element is disposed external to the first device. As a further example, the first security element can communicate with the second security element to authorize the first device.

In step 408, the security token can be received by a device, such as the first device. In an aspect, the first device can be located within a first network and the security token can be received from a second network external to the first network. The security token can comprise a security key, function, character or bit string, and the like. As an example, the security token can be used to encrypt and/or decrypt information transmitted between devices, such as a request for data transmitted between the first device and a second device, such as a user device, a computing device, an access point, a service gateway, and the like. The security token can be associated with an addressable identifier to facilitate transmission, tracking, and processing of the security token. The security token can be a renewable security token having a predetermined time duration before expiration and a mechanism for renewing or resetting the time duration. In another aspect, providing the security token to the first device can comprise one or more of transmitting the security token to the first device, activating the security token, and renewing the security token.

In step 410, a request for information can be transmitted, for example, to a second device (e.g., user device, computing device, service provider device, service gateway, access point, etc.). In an aspect, the request can comprise an unencrypted data field (e.g., time, date, address, identifier, etc.) and an encrypted data field. As an example, the encrypted data field can be encrypted using the received security token. As another example, the encrypted data field can be an encrypted version of the unencrypted data field. As a further example, the security token can be used to encrypt at least a portion of a request for services. In step 412, the second device can receive the encrypted request, decrypt the request using the security token and authenticate the request. Authentication can comprise comparing the unencrypted data to the decrypted data to determine if the data substantially matches, thereby indicating an authentic request. Accordingly, the first device can make requests for secure services using the security token. The request can be processed by a facilitator of the secure services using the security token. As such, the request can be processed independent of the manufacturer's credentials associated with the first device. Other mechanisms and methods can be used for authentication. As such, an authenticated request can be satisfied by transmitting the requested service(s). In step 414, the requested information can be received, for example, via the second device.

Figure 5:
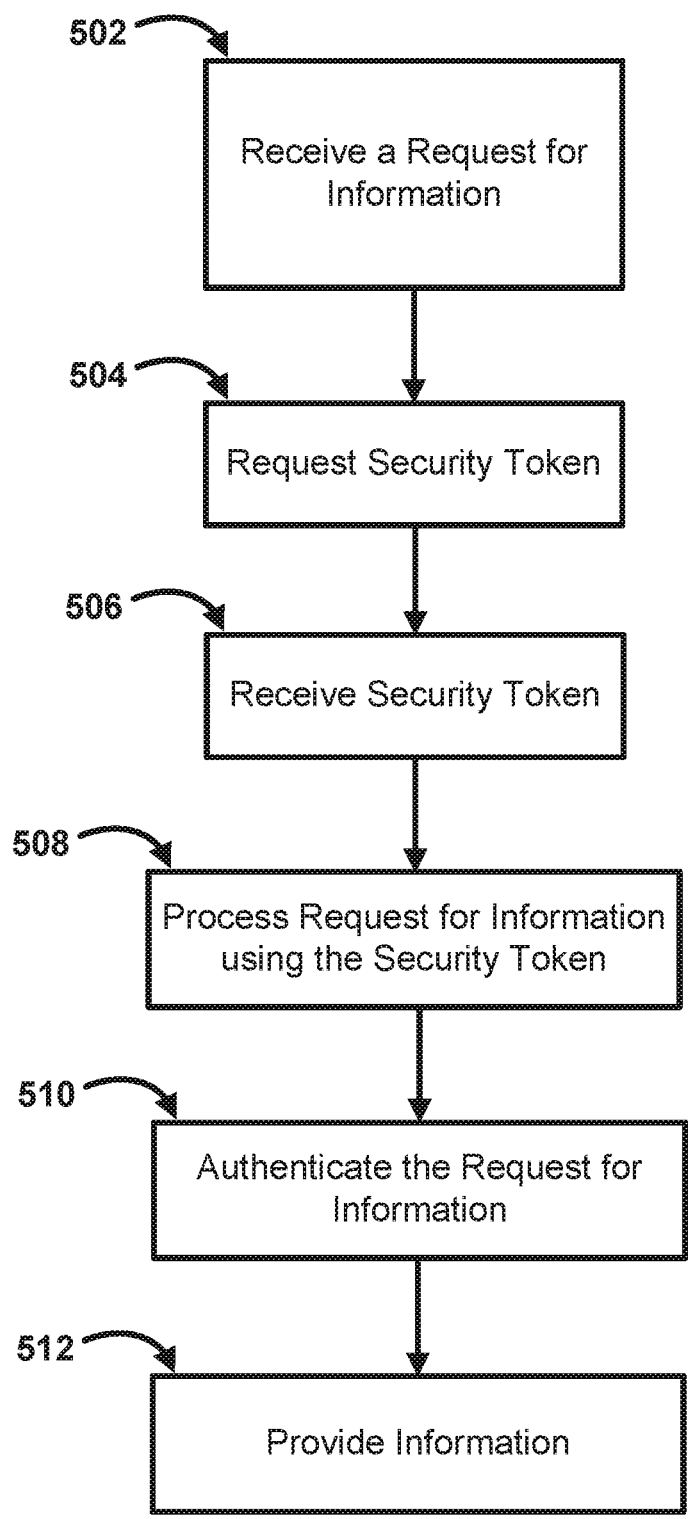
FIG. 5 is a flow chart of an example method.

An exemplary method for providing secure services to a device is shown in FIG. 5. In step 502, a request for information can be received, for example, by a device (e.g., user device, computing device, service provider device, service gateway, access point, etc.). In an aspect, the request can comprise an unencrypted data field (e.g., time, date, address, identifier, etc.) and an encrypted data field. As an example, the encrypted data field can be encrypted using a security token. As another example, the encrypted data field can be an encrypted version of the unencrypted data field. In an aspect, the security token can comprise a security key, function, character or bit string, and the like. As an example, the security token can be used to encrypt and/or decrypt information transmitted between devices, such as a request for data transmitted between the user device and another device (e.g., another user device, a computing device, an access point, a service gateway, and the like). As another example, the security token can be associated with an addressable identifier to facilitate transmission, tracking, and processing of the security token. As a further example, the security token can be a renewable security token having a predetermined time duration before expiration and a mechanism for renewing or resetting the time duration.

In step 504, the security token can be requested. In an aspect, the device receiving the request for information can request the security token based upon the received request for information. As an example, the security token can be requested from a local software or hardware element. As a further example, the security token can be requested from a device or element, such as a security element, located external to the device. In another aspect, if the device has the security token, a request for the security token need not be executed.

In step 506, the security token can be received, for example, by the device requesting the security token or another device. In an aspect, the device can be located within a first network and the security token can be received from a second network external to the first network. In another aspect, the security token can be received from local storage or an element co-located with the device.

In step 508, the request for information can be processed. In an aspect, processing the request for information can comprise decrypting the encrypted data field of the request for information. As an example, the encrypted data field of the request for information can be decrypted using the security token.

In step 510, the request for information can be authenticated. In an aspect, authenticating the request for information can comprise comparing the decrypted data field to the unencrypted data field of the request for information. In an aspect, if the decrypted data field matches the unencrypted data field, the request can be considered an authentic request. As such, the requested information can be transmitted, or otherwise provided, to a source of the request for information, at 512. Other mechanisms and methods for authentication can be used.

Figure 6A:
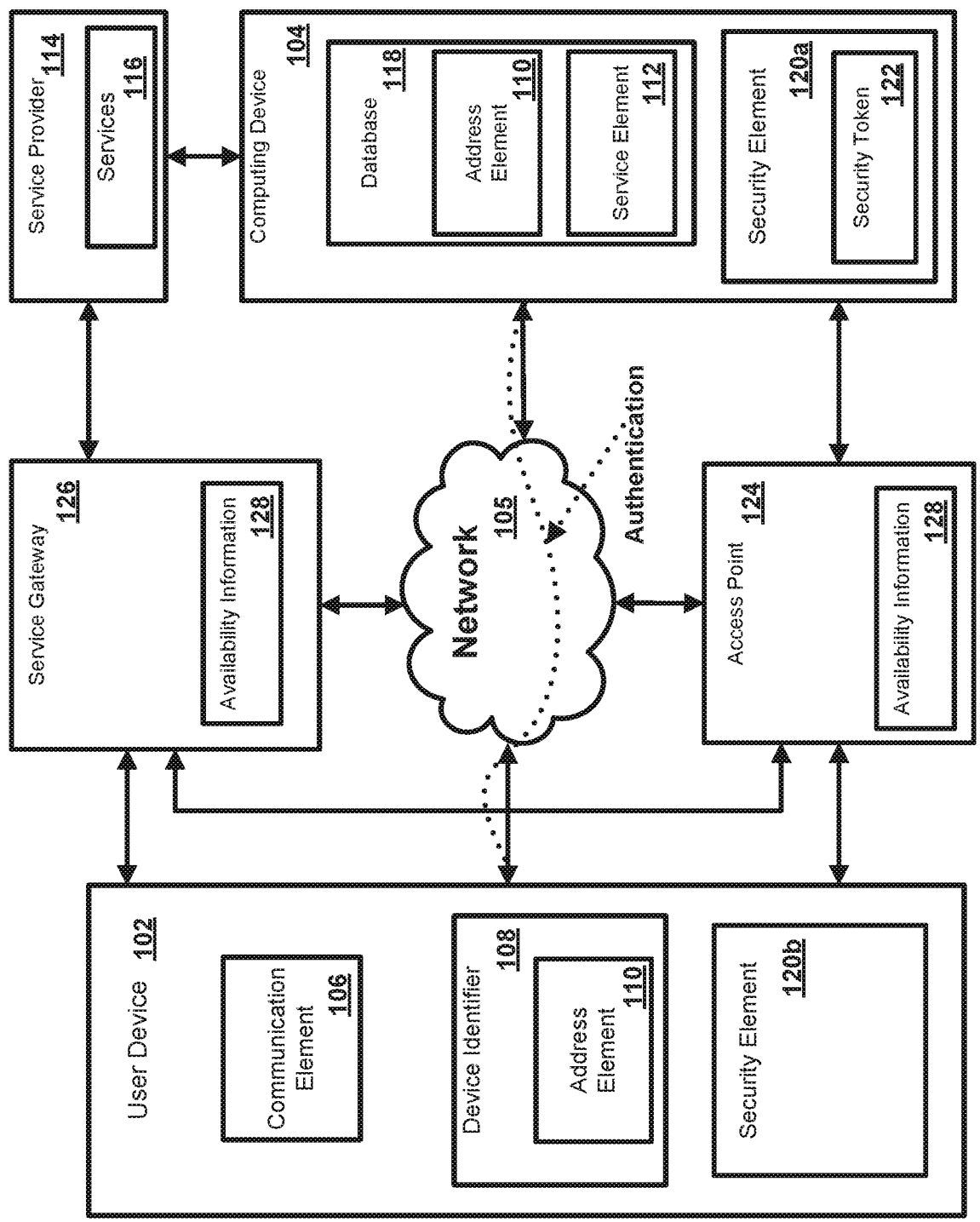
FIG. 6A is a block diagram of an example system and network.

FIGS. 6A-6D show an example architecture, method, and process for providing secure services. Although FIGS. 6A-6D show the use of the system of FIG. 1A, for example, to implement the example method and process, other systems, physical and/or logical, can be used. In an aspect, the communication element 106 (e.g., browser, HTTP user agent (UA), etc.) can be a manufacturer installed and trusted component of the user device 102 (e.g., client). A user can request services from the user device 102. For example, such requests can be provided by the user device 102 via a native user (e.g., client) application menu or URI input feature. As a further example, once the request is initiated, it can be determined whether the appropriate security element 120b is associated (e.g., present, activated, downloaded, registered, etc.) with the user device 102. If the security element 120b is not associated, a secure download and execution of the security element 120b can be initiated, as illustrated in FIG. 6A.

In an aspect, a user agent such as the communication element 106 can be configured to authenticate the user device 102 and/or a user associated with the user device 102. As an example, the communication element 106 can cause execution of a secure authentication method, such as a Public Key Infrastructure (PKI) protocol using credentials (e.g., certificate issued by a trusted authority or chain of trust, user credentials, device credentials, etc.), with security element 120a (e.g., a service provider security server (SPSS) at a known URI or public IP address), as shown in FIG. 6A. Note that this mechanism can be used in conjunction with both software and hardware-backed security environments or roots of trust e.g. Intel Insider or ARM Trustzone).

In an aspect, if an identifier associated with the user device 102 and/or user of the user device 102 is on a service provider's managed data network (e.g., user account is subscribed to data services), information relating to the user/user device 102 (e.g., the customer account (CA) information) can be determined using the MAC address of a data gateway (e.g., cable modem) that is associated with the user/user device 102.

In another aspect, on an unmanaged data network, for example, a user login (e.g. username/password) may be required by one or more of the communication element 106 and the security elements 120a, 102b to establish user/device identification. As an example, such login information (e.g., credentials) can be persisted by a cookie. Thus, the cookie can be used in conjunction with this or other user or account authentication models. In an aspect, the cookie may be a secure session cookie. This session cookie can be used to generate the (renewable) security token 122 that protects individual content requests over any network, such as a LAN.

In an aspect, the communication element 106 can use the authentication protocol referenced above, such as PKI, to authenticate the user/user device 102 with the security element 120a and may also securely provide trusted user information (e.g., device manufacturer, model, version) to the security element 120a, or may provide an agreed upon standard credential via standard security protocols (e.g., x.509 using TLS 1.2) or other agreed upon credential via extended security protocol (e.g. DTLA credential via TLS 1.2 supplemental data extension). In another aspect, the security element 120a can be configured to receive or access such user information in a service provider maintained database to decide whether to authorize the user/user device 102.

In an aspect, when the security element 120a authorizes the user/user device 102, the security element 120a may register the user/user device 102 in a managed database (e.g., database 118) by storing the user credentials (e.g. digital certificate). The security element 120a and/or communication element 106 can also execute a system renewability messaging protocol to renew authorization according to a generally accepted or standard security policy. The security element 120a may return an authentication token for use by the communication element 106 in requesting RUI content from the Service Provider's RUI server using standard HTTPS requests, or in another embodiment in clear HTTP requests after signing the authentication token.

Figure 6B:
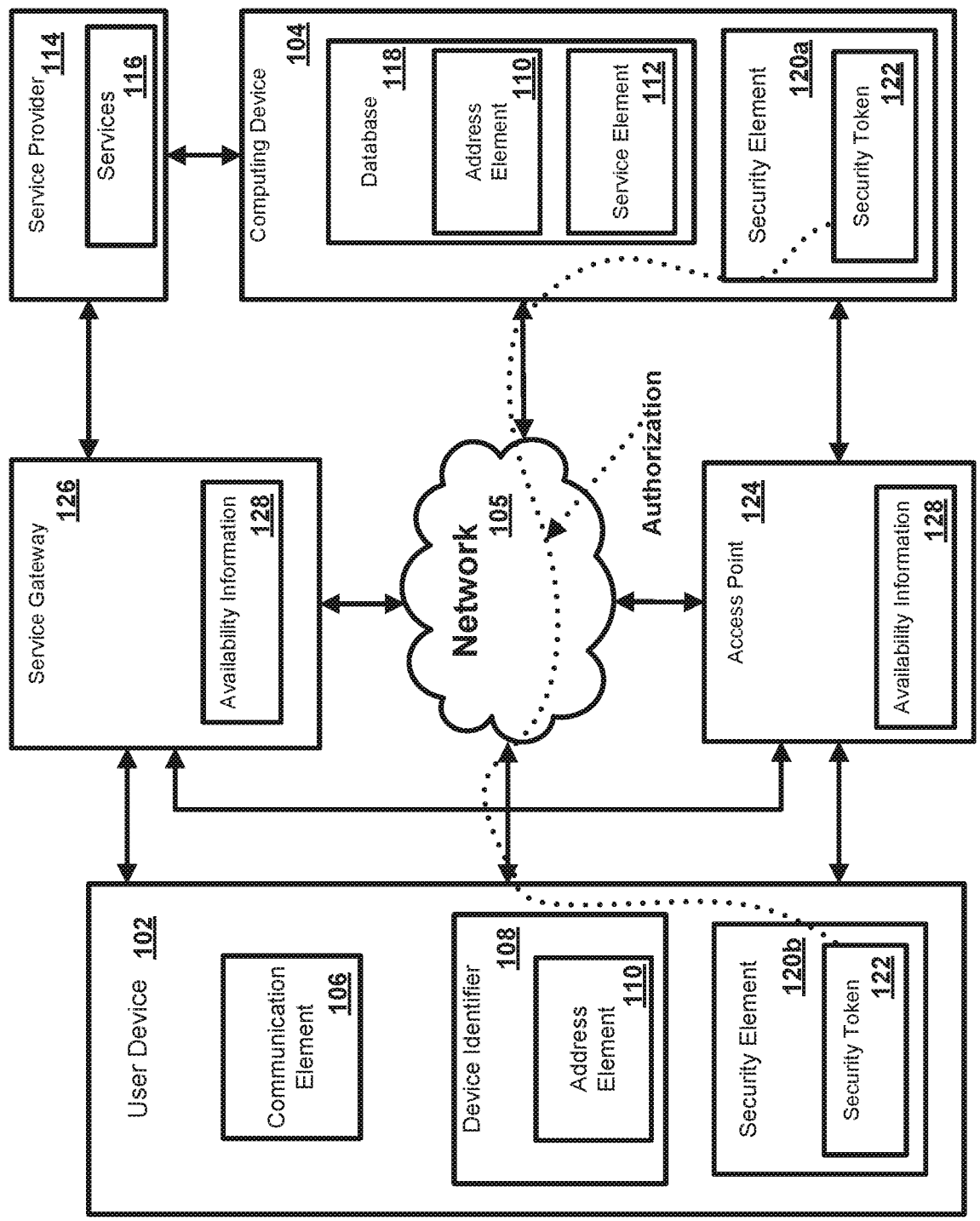
FIG. 6B is a block diagram of an example system and network.

In an aspect, when the user/user device 102 can be authorized against user information, such as a customer account (CA) (e.g. by checking a certificate and/or the secure session cookie) and the security element 120b credentials (e.g. digital certificate) are authorized by the security element 120a, the security element 120a can issue the security token 122 (e.g., shared secret (AS_KEY), etc.) to the user/user device 102, as shown in FIG. 6B. The security element 120a can register the security token 122 and security element 120b credentials in the database 118 in association with the CA and user/user device 102. As an example, the security token 122 (e.g., AS_KEY (AS_ KEY [N])) can be deregistered on expiry, or when the security element 120b reauthorizes and is assigned a new security token (AS_KEY [N+1]).

Figure 6C:
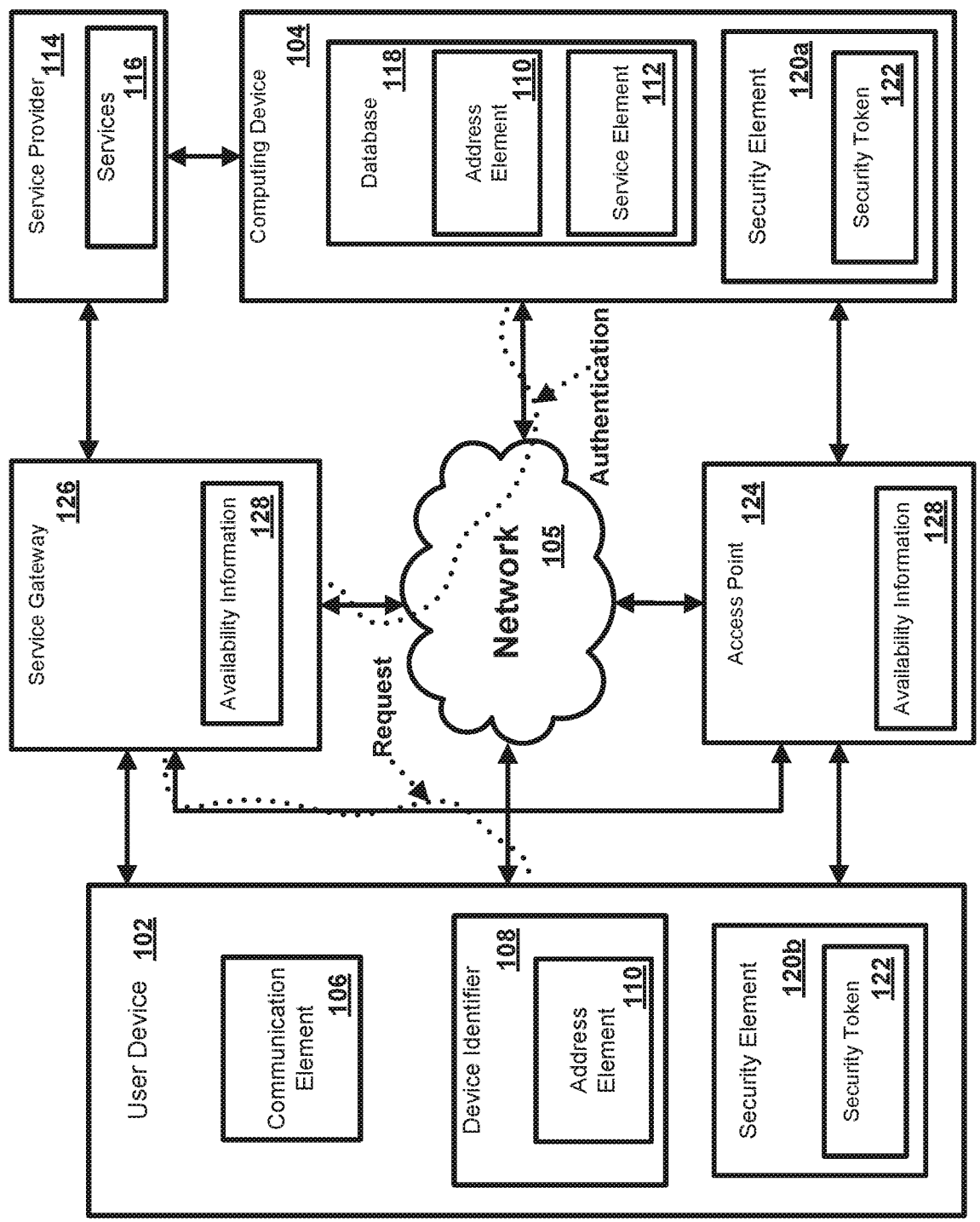
FIG. 6C is a block diagram of an example system and network.

In an aspect, the security element 120b can utilize the security token 122 as a symmetric encryption key to encrypt a data field that can be included in requests for services, such as services over the LAN and/or services from a gateway (e.g., service gateway 126) or server (e.g., video gateway server (VGS)) or other device, as shown in FIG. 6C. The security element 120b can transmit both the original unencrypted data field and the encrypted data field in the service request. For example, the security element 120b can transmit a request for video services over the LAN to a VGS (or another device) by invoking, such as through Javascript or other programming environment, an intermediary component (e.g., video player object) of the communication element 106 to transmit the request to the VGS on behalf of the security element 120b. As a further example, in such video transport requests using the HTTP GET protocol, two HTTP headers may be added to video transport requests, as follows:

timestamp header—integer representing unix time (millis since epoch—1.1.1970)

secure_hash header—string representing timestamp encrypted with AS_KEY

In another aspect, the security element 120b can generate a secure request (e.g. HTTPS or SSL/TLS) to the security element 120a to generate the secure token 122 to be used in the service request, rather than performing the encryption on the user device 102. As an example, the secure session cookie that has been established by the security element 120a for the session can be used to secure the security token generation request to the security element 120b session.

In another aspect, where secure messaging, such as HTTPS or SSL/TLS, is available between the security element 120b (or a component acting on behalf of the security element 120b) and a computing device, such as computing device 104, service gateway 126, access point 124, and the like, the security token 122 can be passed directly as an HTTP header for validation by the computing device, since the entire message can be encrypted by the underlying secure protocol. For example, in service discovery requests using the UPnP protocol a rendering endpoint can use the Search or Browse actions to request information about content provided by a server device such as a Content Directory Service (CDS), the action messages use HTTP POST requests and the timestamp and secure_hash headers can be applied to these messages. likewise, the headers can be applied to any other UPnP action for authentication purposes. As a further example, this service request authentication scheme can also be utilized to secure other non-secure messaging protocols, such as HDMI CEC. In one exemplary embodiment, the <SetOSDString> HDMI CEC message can be utilized to convey an application defined protocol which includes fields that convey similar security validation information as described in the HTTP headers in the above embodiment. A pair of such messages, wherein the protocol also includes message type identifier, can then be used to bracket a set of authorized request/response messages between an HDMI source and HDMI sink.

Figure 6D:
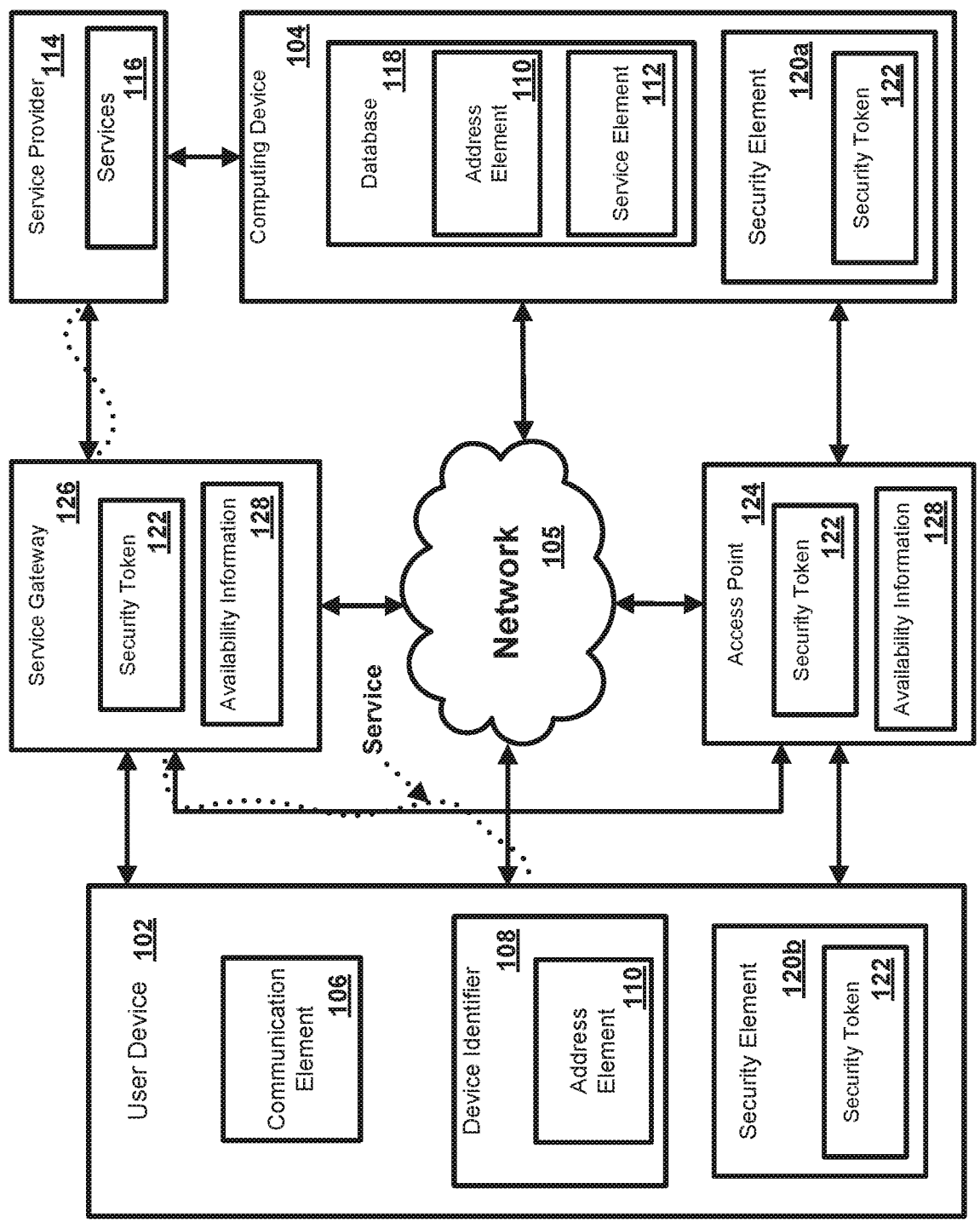
FIG. 6D is a block diagram of an example system and network.

In an aspect, the gateway (e.g., service gateway 126) or server (e.g., video gateway server (VGS)) or other device receiving the request for services can authenticate by determining whether one or more users or devices associated with the request are authorized to receive the requested services, as shown in FIG. 6C. As an example, the security element 120a registers information received from the gateway against information (e.g., CA, credentials, etc.) in the database 118. As an example, when a request for services is received over the LAN from the security element 120b or communication element 106, the gateway can authorize the request by retrieving, from the security element 120a, the security token 122 associated with the particular user/user device 102 (e.g., as identified by the request for services). As another example, the security element 122 can be used to decrypt encrypted information (e.g., the secure_hash) contained in the request. As a further example, the gateway can be configured to compare the decrypted information to a comparator such as a timestamp contained in the request in order to authenticate the request and determine if the requesting user/device can receive the services. In an aspect, if the decrypted information matches the comparator, the requesting device can be authorized to receive the requested services, as shown in FIG. 6D.

In an aspect, the gateway can enforce that a timestamp increases monotonically with every subsequent request from a particular user/user device. Otherwise, the gateway can deny the request. In another aspect, the gateway can utilize the renewable properties of an authorized security token 122 to avoid multiple re-retrievals with consecutive requests (as long as an acceptable security policy regarding notification of AS_KEY deregistration is implemented).

In certain aspects, the communication element 106 (or component thereof, e.g., video player) can transmit the request to the gateway. Accordingly, an application programming interface (API) can be implemented for the security element 120b to pass the timestamp and secure hash to the communication element 106. In certain aspects, the communication element 106 or component thereof (e.g., video player) can transmit multiple requests to the gateway relating to the same service or content asset without returning control execution to the security element 120b. Examples include the video player directly executing trick mode requests for content rewind, fast-forward, skip, jump, indexing, etc. within the video player itself. In such cases, the security element 120b can provide the security token 122 (e.g., AS_KEY) to the video player for use in such multiple requests on the same service or content asset.

In an aspect, host IP interface information can be used to identify the individual host devices that are authorized. If the LAN uses a private IP address space and a Network Address Translation (NAT) protocol is utilized for communications between LAN hosts and external hosts then, for example, the home router can maintain a constant iAddr:iPort (internal) to eAddr:ePort (external) relationship for all messages to a given destination host (hAddr) as long as the LAN host is assigned a given iAddr.

In another aspect, during authorization the security element 120a can detect if there exist multiple eAddr:ePort to iAddr:iPort mappings for a CA and deauthorize the invalid eAddr:ePort entries for that CA. For LAN hosts with public IP addresses, the iAddr:iPort values are the same as (equal to) eAddr:ePort. Using the authentication protocol referenced above, such as PKI, the communication element 106 can authenticate the user/user device 102 with the security element 120a and can securely provide trusted. user information (e.g., client manufacturer, model, version) to the security element 120a. The communication element 106 can also transmit its iAddr:iPort (for public host IP addresses, this is the same as eA.ddr:ePort) to the security element 120a.

When the security element 120a authorizes the user/user device 102, the SPSS registers the user/user device 102 in database 118 by storing the user credentials (e.g., digital certificate), external IP address (eAddr:ePort, which is available in TCP/IP packet as the source IP address and port) and internal LAN IP address (iAddr:iPort) against the Customer Account (CA). The security element 120a and communication element 106 can execute some form of system renewability messaging protocol to renew authorization according to a generally accepted or standard security policy. The communication element 106 can reauthorize whenever its iAddr:iPort changes.

For example, using the iAddr:iPort (available in the IP message from the security element 120b) associated with the user/user device 102, the gateway can use secure communication protocols with the security element 120a to provide secure services. In an aspect, the gateway can request the security token 122 from the security element 120a for authorized applications on the user device 102 by providing the security element 120a with the iAddr:iPort associated with the user device 102. In another aspect, the security element 120*a* can query or access the CA associated with the gateway and locate the authorized security tokens 122 that are associated with the user/user device 102 in the database 118 (which can be identified using the CA and/or the Client iAddr:iPort). In another aspect, the security element 120*a* can provide one or more authorized security tokens 122 to the gateway. As such, the gateway can use one or more of the authorized security tokens as a symmetric decryption key to decrypt information received in a request from the user/user device 102. The value obtained from decrypting information can be compared for equality with a comparator. If they are equal, the gateway can authorize the request. The authorized request can be processed by the gateway and the requested services/content can be provided to the user device 102. Otherwise the request can be denied.

Figure 7:
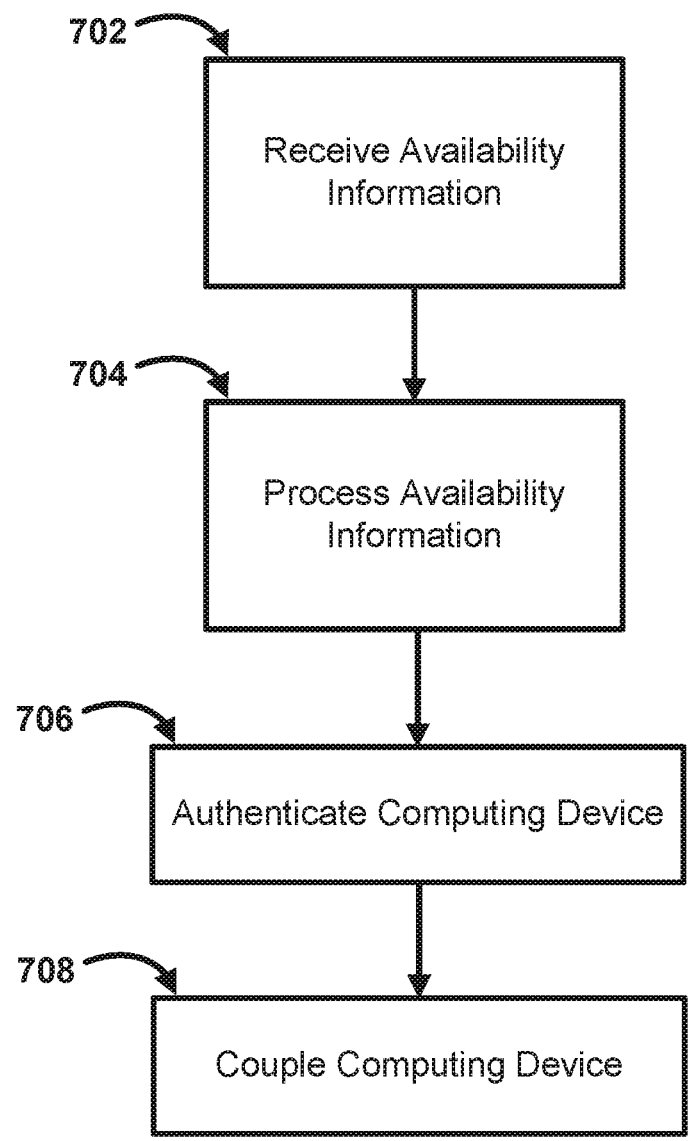
FIG. 7 is a flow chart of an example method.

An exemplary method for providing one or more secure services to one or more devices is shown in FIG. 7. In step 702, availability information can be received, for example, by a computing device, such as a user device, client device, user agent, service agent, and the like. Availability information can relate to one or more services available via a particular device or network (e.g., LAN). In an aspect, the availability information can be received in a first format such as an encrypted or encoded format (e.g., secure hash format). As an example, the availability information can relate to one or more secure services available via a network. Services can comprise printing, media management (e.g., media server), content services, streaming services, digital living network alliance (DLNA) enabled services, or other services.

In step 704, the availability information can be processed to generate availability information in a second format. In an aspect, processing the availability information can comprise decrypting at least a portion of the availability information. The first and second format can be same or different.

In step 706, a computing device can be authenticated. In an aspect, the computing device that receives the availability information and/or processes the availability information can use the availability information to access one or more available services. As an example, the computing device can request one or more services based on the availability information. Once the request is received, the requesting computing device can be authenticated to ensure the computing device or a user associated with the computing device is authorized to receive the requested services.

In step 708, the computing device (e.g., authenticated computing device) can be operatively coupled to the one or more services using the availability information in the second format. Services can comprise printing, media management (e.g., media server), content services, streaming services, digital living network alliance (DLNA) enabled services, or other services.

Figure 8:
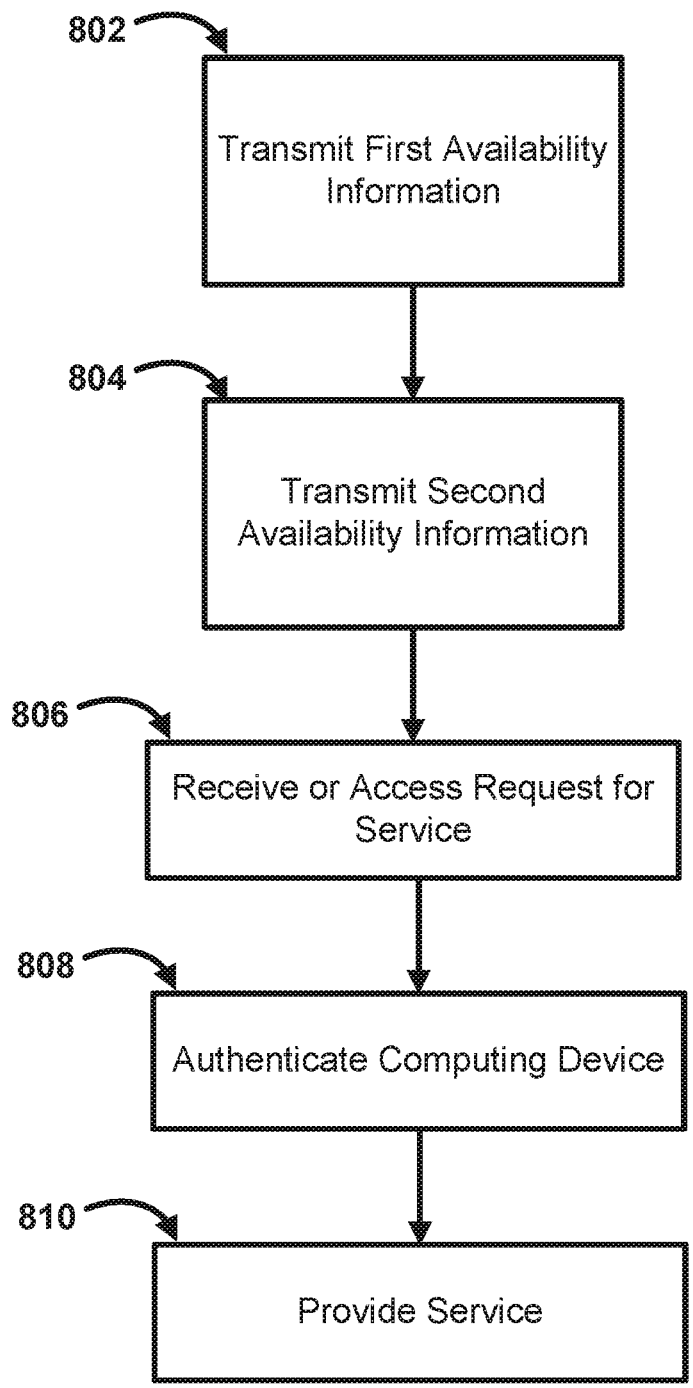
FIG. 8 is a flow chart of an example method.

An exemplary method for providing one or more secure services to one or more devices is shown in FIG. 8. In step 802, first availability information can be transmitted, for example, by a computing device, such as a user device, router, gateway, access point, service agent, and the like. First availability information can relate to one or more first services available via a particular device or network (e.g., LAN). In an aspect, the first availability information can be transmitted in a first format such as an unencrypted format.

In step 804, second availability information can be transmitted, for example, by a computing device, such as a user device, router, gateway, access point, service agent, and the like. Second availability information can relate to one or more second services available via a particular device or network (e.g., LAN). In an aspect, the second availability information can be transmitted in a second format such as an encrypted format.

The first availability information and/or the second availability information can be selectively transmitted to one or more devices. As an example, the first availability information and/or the second availability information can be broadcast over an area, such as, a local area network (LAN). In an aspect, one or more devices within range of the broadcast can receive (e.g., discover) the first availability information. However, one or more devices within the range of the broadcast may not be configured to discover the second availability information. For example, if the second availability information is encrypted, one or more devices may not be configured to decrypt the second availability information and therefore may not be able to access the second services.

In step 806, a request for services can be received, for example, by a gateway, service provider, access point, or the like. In an aspect, the request can be received based upon one or more of the first availability information and the second availability information. As an example, one or more of the first availability information and the second availability information can comprise addressable information for requesting related services. As a further example, the second availability information can be decrypted by a receiving device to facilitate discovery of addressable information for requesting related services. Services can comprise printing, media management (e.g., media server), content services, streaming services, digital living network alliance (DLNA) enabled services, or other services.

In step 808, a computing device can be authenticated. In an aspect, the computing device that receives the second availability information and/or processes the second availability information can use the second availability information to access one or more secure services. As an example, the computing device can request one or more services based on the second availability information. Once the request is received, the requesting computing device can be authenticated to ensure the computing device or a user associated with the computing device is authorized to receive the requested services.

In step 810, the computing device (e.g., authenticated computing device) can be operatively coupled to the one or more services using one or more of the first availability information and the second availability information. Services can comprise printing, media management (e.g., media server), content services, streaming services, digital living network alliance (DLNA) enabled services, or other services.

Figure 9:
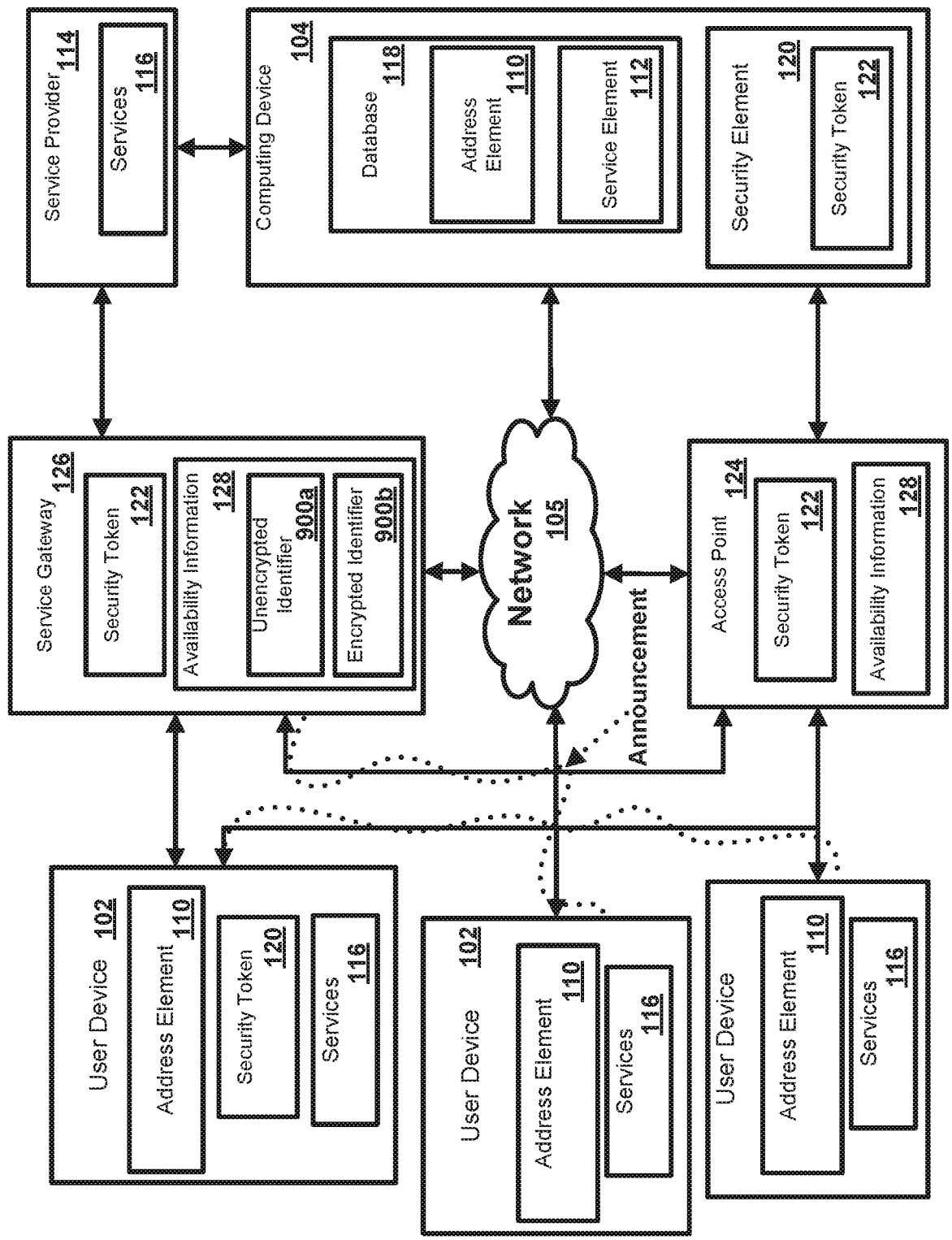
FIG. 9 is a block diagram of an example system and network.

FIG. 9 shows an example method and process for providing secure services. Although FIG. 9 shows the use of the system of FIG. 1B to implement the example method and process, other systems, physical and/or logical, can be used. As more clearly shown in FIG. 9, a system can be configured to facilitate the secure and selective announcement and discovery of services enabled across any network, such as a LAN or user premises network. As an example, a user premises network (e.g., LAN) can comprise a wireless printer. The printer can announce the availability of printing services openly over the user premises network. As another example, a name or identifier such as "John Doe's Printer" can be openly advertised using an unencrypted identifier 900*a* (e.g., IP address 10.0.0.10 and 2001:db8:0:10:0:0:10). Computing devices such as a user device can receive the announced information and can use such information to access printing services to the user device from "John Doe's Printer." As a further example, a file-sharing device can be connected to the user premises network, for example, via a router. The user premises router can selectively advertise the availability of file sharing services. It may be desirable to securely advertise the file sharing service. As such, the identifier and address of the file-sharing service can be announced using an encrypted identifier 900b. For example, instead of seeing "John Doe's File Sharing" at 10.0.0.11 or 2001:db8:0:10:0:0:11, the identifier and address can be received as encrypted data such as, 6c1e9318e64974c036bb1619b03ec5d8 at db1dd528b0e0c9a347eda778aec00559 or 4e4004437139efa09b21fd7a9f04648a. Without decryption, such encrypted service information (e.g., encrypted identifier 900b) may be unusable and as such the service, while openly advertised, is protected due to the encrypted nature of the secured service discovery data. When a specific device or specific application on a device, such as a user device, has the necessary information to decode and/or decrypt the secure service discovery data the same could in turn proceed with enabling support for the service. End user authorization may or may not be utilized.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
    sending first availability information in an unencrypted format, wherein the first availability information relates to a first service available via a network;
    sending second availability information in an encrypted format, wherein the second availability information relates to a second service available via the network; and
    receiving, from a first device based on one or more of the first availability information or the second availability information, a request for the first service or a request for the second service, wherein the request for the first service or the request for the second service comprises an encrypted data field and an unencrypted data field.

2. The method of claim 1, wherein the network comprises a local area network and wherein the first device is configured to decrypt the second availability information.

3. The method of claim 1, further comprising authenticating, based on the request, the first device.

4. The method of claim 1, wherein sending the first availability information in the unencrypted format comprises sending the first availability information in the unencrypted format to at least one of the first device or a second device; and
    wherein sending the second availability information in the encrypted format comprises sending the second availability information in the encrypted format to at least one of the first device or the second device.

5. The method of claim 4, wherein the second device is not configured to decrypt the second availability information, and wherein the second device is not configured to receive the second service.

6. The method of claim 1, wherein sending the first availability information comprises broadcasting the first availability information over an area and wherein sending the second availability information comprises broadcasting the second availability information over the area.

7. The method of claim 1, wherein the first availability information is configured to facilitate receiving the first service, and wherein the second availability information is configured to facilitate receiving the second service.

8. The method of claim 1, further comprising:
    determining, based on the encrypted data field and the unencrypted data field, that the first device is an authorized device; and
    granting, to the first device, access to one or more of: the first service or the second service.

9. An apparatus, comprising:
    one or more processors; and
    a memory storing processor executable instructions that, when executed by the one or more processors, cause the apparatus to:
        send first availability information in an unencrypted format, wherein the first availability information relates to a first service available via a network;
        send second availability information in an encrypted format, wherein the second availability information relates to a second service available via the network; and
        receive, from a first device based on at least one of the first availability information or the second availability information, a request for the first service or a request for the second service, wherein the request for the first service or the request for the second service comprises an encrypted data field and an unencrypted data field.

10. The apparatus of claim 9, wherein the network comprises a local area network and wherein the first device is configured to decrypt the second availability information.

11. The apparatus of claim 9, wherein the processor executable instructions, when executed by the one or more processors, further cause the apparatus to authenticate, based on the request for the first service or the request for the second service, the first device.

12. The apparatus of claim 9, wherein sending the first availability information in the unencrypted format comprises sending the first availability information in the unencrypted format to the first device or a second device; and
    wherein sending the second availability information in the encrypted format comprises sending the second availability information in the encrypted format to the first device or the second device.

13. The apparatus of claim 12, wherein the second device is not configured to decrypt the second availability information, and wherein the second device is not configured to receive the second service.

14. The apparatus of claim 9, wherein the processor executable instructions that, when executed by the one or more processors, cause the apparatus to send the first availability information further cause the apparatus to broadcast the first availability information over an area and wherein the processor executable instructions that, when executed by the one or more processors, cause the apparatus to broadcast the second availability information over the area.

15. The apparatus of claim 9, wherein the first availability information is configured to facilitate receiving the first service, and wherein the second availability information is configured to facilitate receiving the second service.

16. The apparatus of claim 9, wherein the processor executable instructions, when executed by the one or more processors, further cause the apparatus to:
   determine, based on the encrypted data field and the unencrypted data field, that the first device is an authorized device; and
   grant, to the first device, access to one or more of: the first service or the second service.

17. One or more non-transitory computer-readable media storing processor executable instructions that, when executed by at least one processor, cause the at least one processor to:
   send first availability information in an unencrypted format, wherein the first availability information relates to a first service available via a network;
   send second availability information in an encrypted format, wherein the second availability information relates to a second service available via the network; and
   receive, from a first device based on at least one of the first availability information or the second availability information, a request for the first service or a request for the second service, wherein the request for the first service or the request for the second service comprises an encrypted data field and an unencrypted data field.

18. The one or more non-transitory computer-readable media of claim 17, wherein the network comprises a local area network and wherein the first device is configured to decrypt the second availability information.

19. The one or more non-transitory computer-readable media of claim 17, wherein the processor executable instructions, when executed by the at least one processor, further cause the at least one processor to authenticate, based on the request for the first service or the request for the second service, the first device.

20. The one or more non-transitory computer-readable media of claim 17, wherein the processor executable instructions that, when executed by the at least one processor, cause the at least one processor to send the first availability information further cause the at least one processor to broadcast the first availability information over an area, and wherein the processor executable instructions that, when executed by the at least one processor, cause the at least one processor to send the second availability information further cause the at least one processor to broadcast the second availability information over the area.

21. The one or more non-transitory computer-readable media of claim 17, wherein at least one of the first availability information or the second availability information is sent to a second device, wherein the second device is not configured to decrypt the second availability information, and wherein the second device is not configured to receive the second service.

22. The one or more non-transitory computer-readable media of claim 17, wherein the first availability information is configured to facilitate receiving the first service, and wherein the second availability information is configured to facilitate receiving the second service.

23. The one or more non-transitory computer-readable media of claim 17, wherein the processor executable instructions, when executed by the at least one processor, further cause the at least one processor to:
   determine, based on the encrypted data field and the unencrypted data field, that the first device is an authorized device; and
   grant, to the first device, access to one or more of: the first service or the second service.

* * * * *